United States Patent
Sagalovsky et al.

(10) Patent No.: US 11,018,562 B2
(45) Date of Patent: May 25, 2021

(54) STATOR OF A SUBMERSIBLE LINEAR ELECTRIC MOTOR AND METHOD FOR ASSEMBLING SAID STATOR

(71) Applicant: Oilfield Equipment Development Center Limited, Victoria (SC)

(72) Inventors: Vladimir Iosifovich Sagalovsky, Moscow (RU); Andrey Vladimirovich Sagalovsky, Moscow (RU)

(73) Assignee: OILFIELD EQUIPMENT DEVELOPMENT CENTER LIMITED, Victoria (SC)

(*) Notice: Subject to any disclaimer, the term of this patent is extended or adjusted under 35 U.S.C. 154(b) by 349 days.

(21) Appl. No.: 15/772,210

(22) PCT Filed: Oct. 30, 2015

(86) PCT No.: PCT/RU2015/000728
§ 371 (c)(1),
(2) Date: Apr. 30, 2018

(87) PCT Pub. No.: WO2017/074213
PCT Pub. Date: May 4, 2017

(65) Prior Publication Data
US 2018/0316250 A1    Nov. 1, 2018

(51) Int. Cl.
*H02K 15/02*    (2006.01)
*H02K 1/18*    (2006.01)
(Continued)

(52) U.S. Cl.
CPC ............. *H02K 15/02* (2013.01); *H02K 1/185* (2013.01); *H02K 5/132* (2013.01); *H02K 41/02* (2013.01)

(58) Field of Classification Search
CPC ........ H02K 15/02; H02K 41/02; H02K 1/185; H02K 1/30; H02K 5/132; H02K 5/128;
(Continued)

(56) References Cited

U.S. PATENT DOCUMENTS

| | | |
|---|---|---|
| 2008/0284264 A1 | 11/2008 | Yuratich et al. |
| 2013/0038144 A1 | 2/2013 | McAleese et al. |
| 2013/0186638 A1* | 7/2013 | Filippov ............... H02K 33/16 166/372 |

FOREIGN PATENT DOCUMENTS

| | | |
|---|---|---|
| RU | 2320063 C2 | 3/2008 |
| RU | 114240 U1 | 3/2012 |

(Continued)

OTHER PUBLICATIONS

International Search Report and Written Opinion, PCT/RU2015/000728, dated Aug. 18, 2016.

*Primary Examiner* — Quyen P Leung
*Assistant Examiner* — Alexander A Singh
(74) *Attorney, Agent, or Firm* — Patterson + Sheridan, LLP

(57) ABSTRACT

The invention relates to the field of electrical engineering, in particular the design of linear electric motors for submersible installations with a plunger pump, and used for oil extraction. The technical result is to increase the durability of the submersible electric motor and the efficiency of its operation. The stator consists of a cylindrical housing, within which are installed magnetically conductive cups incorporating armature coils and support elements separating the groups of cups, whereby the inner diameter of which is less than the inner diameter of the magnetically conductive cups. On the inner surface of the support elements, grooves are provided, the depth of which is more than half the difference between the inner diameters of the magnetically conductive cups and the support elements. Moreover, (Continued)

the magnetically conductive cups and the support elements are installed in a housing with a radial clearance and are attached therein by fastening elements.

14 Claims, 3 Drawing Sheets

(51) Int. Cl.
*H02K 5/132* (2006.01)
*H02K 41/02* (2006.01)

(58) Field of Classification Search
CPC ............ H02K 5/1285; Y10T 29/49009; E21B 43/128
USPC ............. 310/87, 216.004, 216.008, 216.059; 29/596
See application file for complete search history.

(56) References Cited

FOREIGN PATENT DOCUMENTS

| RU | 2538377 C2 | 1/2015 |
| RU | 2014120911 A | 11/2015 |

\* cited by examiner

STATOR OF A SUBMERSIBLE LINEAR ELECTRIC MOTOR AND METHOD FOR ASSEMBLING SAID STATOR

TECHNICAL FIELD

The invention relates to the field of electrical engineering, in particular the design of linear electric motors for submersible installations with a plunger pump, and used for oil extraction.

PRIOR ART

Prior art teaches a stator of a submersible linear electric motor, consisting of a cylindrical housing within which are installed magnetically conductive cups incorporating armature coils and support elements separating the groups of cups, the inner diameter of the support elements being less than the inner diameter of the cups. The stator is assembled by installing the groups of cups with armature coils and support elements inside the cylindrical housing, followed by their fixation (see utility model RU 114240 UI, publ. Mar. 10, 2012, H02K 41/02).

The said design of the stator for a submersible linear electric motor and its method of assembly are selected as prototype.

The disadvantage of the prototype is that while assembling stator, the magnetically conductive cups and support elements are centered in the housing according to their outer diameter. Moreover, due to the engineering tolerances of the radial dimensions of the magnetically conductive cups, they become displaced relative to the axial line of the electric motor. As a result, when installed in the stator of the reciprocating head, its magnetic systems are radially displaced relative to the armature coils. This gives rise to significant radial stress, which adversely affects the durability of the submersible electric motor and the efficiency of its operation.

DISCLOSURE OF THE INVENTION

The technical result achieved by implementing the claimed invention consists in increased durability of the submersible electric motor and the efficiency of its operation as a result of reduced radial stress.

The said technical result is achieved in that the stator of the submersible linear electric motor consisting of a cylindrical housing, inside which are installed magnetically conductive cups incorporating armature coils and support elements separating groups of cups, having an inner diameter less than the inner diameter of the cups, on the inner surfaces of the support elements has grooves, the depth of which is more than half the difference between the inner diameters of the cups and the support elements, whereby the cups and the support elements are installed in the housing with radial clearance and are attached therein by fastening elements. The stator assembly includes the installation within the cylindrical housing of groups of cups with armature coils and support elements, and their subsequent fastening. Prior to fastening, the cups and support elements are centered on their inner diameters by a mandrel in the form of a cylindrical rod with ribs, whereby the support elements are centered on the cylindrical surface of the rod and the magnetically conductive cups on the outer surface of the ribs passing through the grooves are provided on the inner surface of the support elements.

Fastening elements may be provided in the form of threaded parts placed on the ends of the cylindrical housing.

IMPLEMENTATION OF THE INVENTION

Figure 1:
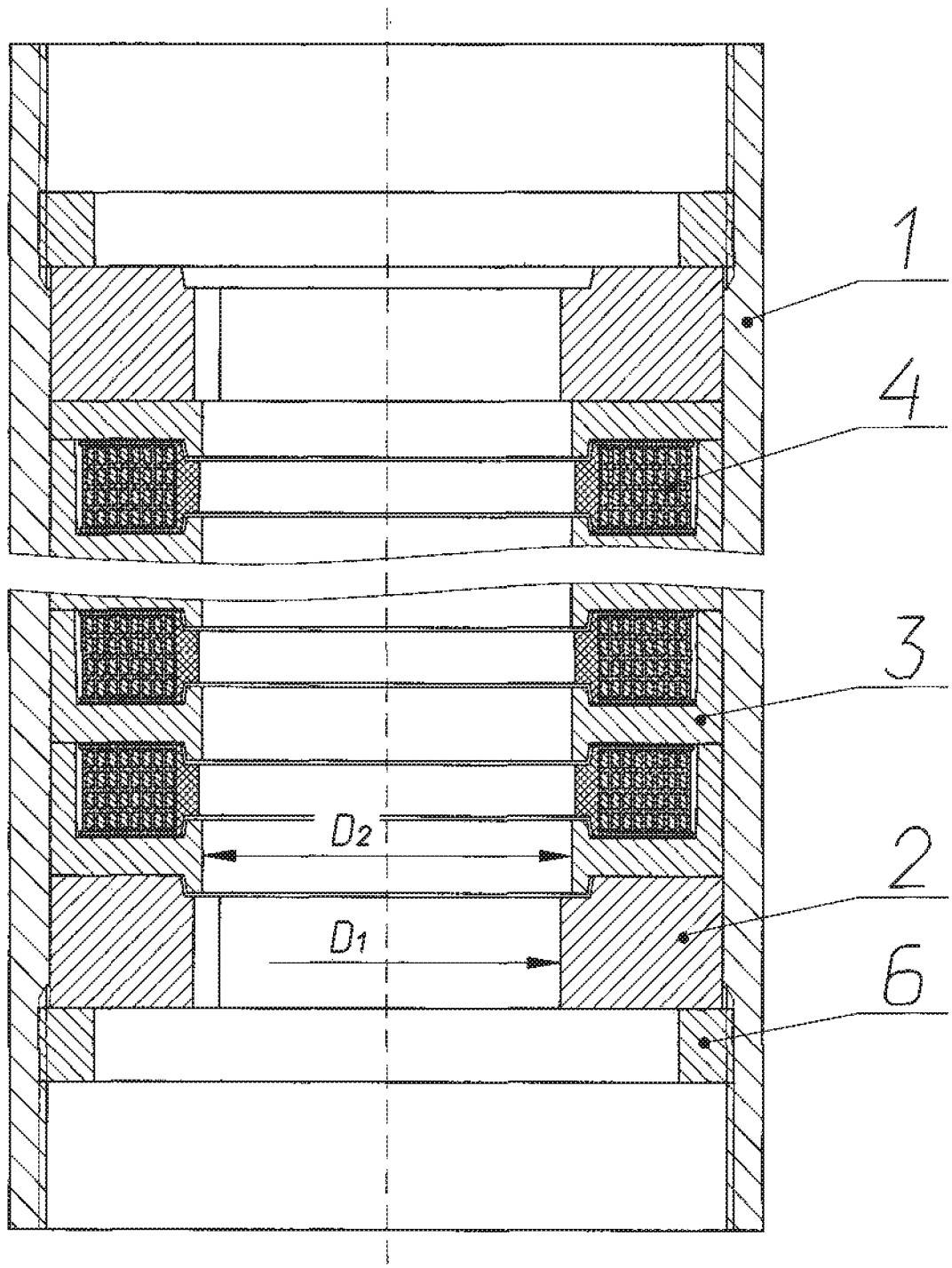
FIG. 1 shows a longitudinal section of the stator.
Figure 2:
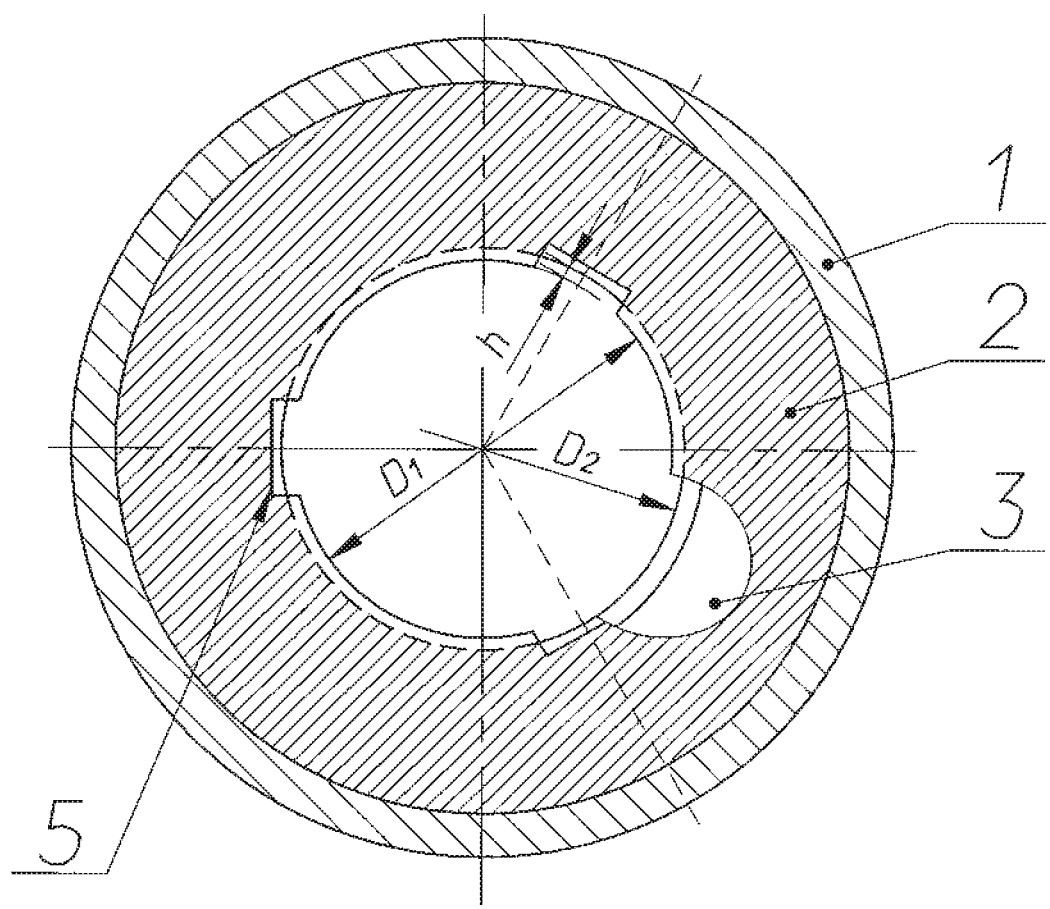
FIG. 2 is a cross-sectional view of the stator along a support element.
Figure 3:
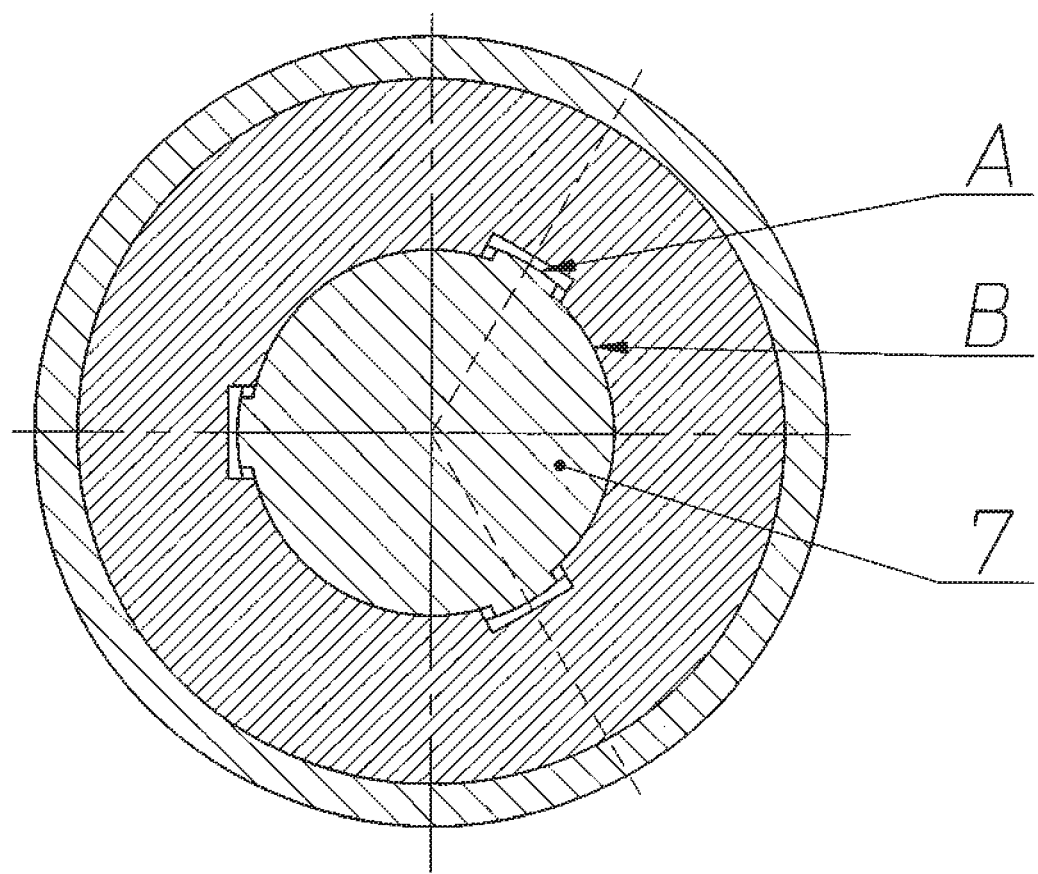
FIG. 3 shows a cross section of the stator with a mandrel.

The stator consists of a cylindrical housing 1, in which support elements 2 for a reciprocating head (not shown in the drawing) are installed, and magnetically conductive stator 3 cores, within which the armature coils 4 are located. The inner diameter of the magnetically conductive cores $D_2$ is greater than the inner diameter of the support elements $D_1$. The support elements 2 and the magnetically conductive cores 3 are attached in the housing 1 by fastening elements 6 provided in the form of threaded parts placed at its ends.

On the inner surface of the support elements 2, grooves 5 are provided, whose depth (h) is more than half the difference between the inner diameters $D_1$ and $D_2$.

When assembling the stator, a mandrel 7, provided in the form of a cylindrical rod with ribs, is used. The support elements 2 are centered on their inner diameter $D_1$ along the cylindrical surface B of the mandrel 7, while the ribs of the mandrel pass through the grooves 5 on the inner surface of the support elements 2. The magnetically conductive cores 3 are centered by their inner diameter $D_2$ on the outer surface A of the mandrel ribs.

The dimensions of the mandrel ensure a sliding fit of the support elements and the magnetically conductive cores along its surfaces. The support elements 2 assembled on the mandrel and the magnetically conductive cores 3, inside which the armature coils 4 are located, are inserted into the housing 1 and attached therein by the fastening elements 6.

With this stator assembly technology, a minimal displacement of the armature coils from the axial line of the submerged electric motor is ensured, thus significantly reducing radial stress and, as a result, improving the durability of the submersible electric motor and the efficiency of its operation.

The invention claimed is:

1. A stator of a linear submersible electric motor, comprising:
   a cylindrical housing;
   a support element pair disposed in the cylindrical housing, wherein each support element in the support element pair includes:
   a bore including a first inner diameter; and
   a plurality of grooves on an inner surface of the support element, each groove having a radial depth;
   a plurality of magnetically conductive cups disposed in the cylindrical housing, wherein the plurality of magnetically conductive cups is disposed between each support element of the support element pair, wherein each magnetically conductive cup includes:
   an armature coil; and
   a bore including a second inner diameter that is greater than the first inner diameter;
   wherein the radial depth is greater than half of a difference between the second inner diameter and the first inner diameter.

2. The stator of claim 1, wherein a plurality of fastening elements are disposed in the cylindrical housing, wherein the plurality of fastening elements are configured to attach the plurality of magnetically conductive cups and the support element pair to the cylindrical housing.

3. The stator of claim 2, wherein the plurality of fastening elements are threaded to an inner surface of the cylindrical housing.

4. The stator of claim 2, wherein the plurality of fastening elements are disposed completely within the cylindrical housing with no sides exposed outside of the housing.

5. A method of assembling a stator of a linear submersible motor, comprising:
    installing a plurality of magnetically conductive cups within a cylindrical housing, wherein the plurality of magnetically conductive cups are disposed between a first support element and a second support element, wherein:
        each magnetically conductive cup includes:
            an armature coil; and
            a bore including an inner diameter;
        the first support element the second support element each include:
            an inner surface defined by a bore and a plurality of grooves, wherein the bore of the respective support element includes an inner diameter that is less than the inner diameter of the bore of each magnetically conductive cup, and each groove includes a radial depth, wherein the radial depth is greater than half of a difference between the inner diameter of the bore of the magnetically conductive cup and the inner diameter of the bore of the respective support element;
    centering the plurality of magnetically conductive cups and the first support element and the second support element with a mandrel disposed in the bore of each magnetically conductive cup and in the bore of the first support element and the bore of the second support element, wherein the mandrel includes a plurality of ribs, wherein each rib is disposed in a corresponding groove of the first support element and a corresponding groove of the second support element.

6. The method of claim 5, further comprising attaching the plurality of magnetically conductive cups and the first support element and the second support element within the cylindrical housing with a plurality of fastening elements.

7. The method of claim 6, wherein the plurality of magnetically conductive cups and the first support element and the second support element are attached within the cylindrical housing after the centering of the plurality of magnetically conductive cups and the first support element and the second element.

8. The method of claim 6, wherein the plurality of fastening elements are threaded to an inner surface of the cylindrical housing.

9. The method of claim 6, wherein the plurality of fastening elements are disposed completely within the cylindrical housing with no sides exposed outside of the cylindrical housing.

10. The method of claim 5, wherein while centering, the mandrel contacts the inner surface of the first support element and the second support element and contacts the magnetically conductive cups.

11. A stator of a linear submersible electric motor, comprising:
    a magnetically conductive cup including a cup bore with an inner diameter;
    a support element including an inner surface defined by a bore and a plurality of grooves, wherein the bore includes a first diameter that is less than the inner diameter, wherein the plurality of grooves have a radial depth that is greater than half a difference between the inner diameter and the first diameter.

12. The stator of claim 11, further comprising a second magnetically conductive cup.

13. The stator of claim 11, further comprising a second support element.

14. The stator of claim 11, wherein the magnetically conductive cup and the support element are disposed within a cylindrical housing.

* * * * *